(12) United States Patent
Emmert et al.

(10) Patent No.: US 7,401,465 B2
(45) Date of Patent: Jul. 22, 2008

(54) DUAL PUMP DUAL PRESSURE HYDRAULIC CIRCUIT

(75) Inventors: Robert Clayton Emmert, Waverly, IA (US); Gregory Evan Sparks, Hudson, IA (US); Gary Lee Dostal, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 303 days.

(21) Appl. No.: 11/280,522

(22) Filed: Nov. 16, 2005

(65) Prior Publication Data

US 2007/0107421 A1     May 17, 2007

(51) Int. Cl.
*F16D 31/02*     (2006.01)

(52) U.S. Cl. ......................................................... 60/430

(58) Field of Classification Search .................... 60/421, 60/430, 486
See application file for complete search history.

(56) References Cited

U.S. PATENT DOCUMENTS

| | | | |
|---|---|---|---|
| 4,335,577 A | | 6/1982 | Lobmeyer et al. |
| 4,733,582 A | * | 3/1988 | Eggert et al. .................. 474/28 |
| 4,770,083 A | | 9/1988 | Johnson |
| 5,201,174 A | | 4/1993 | Barber et al. |
| 5,289,680 A | | 3/1994 | Obe et al. |
| 5,335,494 A | | 8/1994 | Benko et al. |
| 5,481,872 A | | 1/1996 | Karakama et al. |
| 5,615,553 A | * | 4/1997 | Lourigan ...................... 60/486 |
| 5,813,226 A | * | 9/1998 | Krone et al. .................. 60/327 |
| 6,460,655 B2 | | 10/2002 | Miller |
| 6,761,658 B1 | | 7/2004 | Stettler, Jr. |

OTHER PUBLICATIONS

Mistry and Sparks, *Infinitely Variable Transmission (IVT) of John Deere 7000 Ten Series Tractors*, ASME, 2002, pp. 1-16, 18, p. 17 is missing.

Fendt, "Transmission hydraulic circuit diagram and legend" from Fendt tech manual, 2000, 3 pages.

* cited by examiner

*Primary Examiner*—F. Daniel Lopez

(57) ABSTRACT

A hydraulic system is provided for an engine driven vehicle. The hydraulic system includes a higher pressure engine driven pump for supplying pressurized fluid to a higher pressure circuit via a first supply line. The system also includes a lower pressure engine driven pump for supplying lower pressure fluid to a lower pressure circuit via a second supply line. The system also includes a pressure responsive relief valve. The relief valve has a sensing port connected to the first supply line, an inlet connected to the first supply line, and an outlet connected to the second circuit via the second supply line. The relief valve opens when a demand of the higher pressure circuit is satisfied. A cut-off valve controls communication between the high pressure circuit and a reservoir, and a control unit controls the cut-off valve as a function of operation of the high pressure circuit.

9 Claims, 1 Drawing Sheet

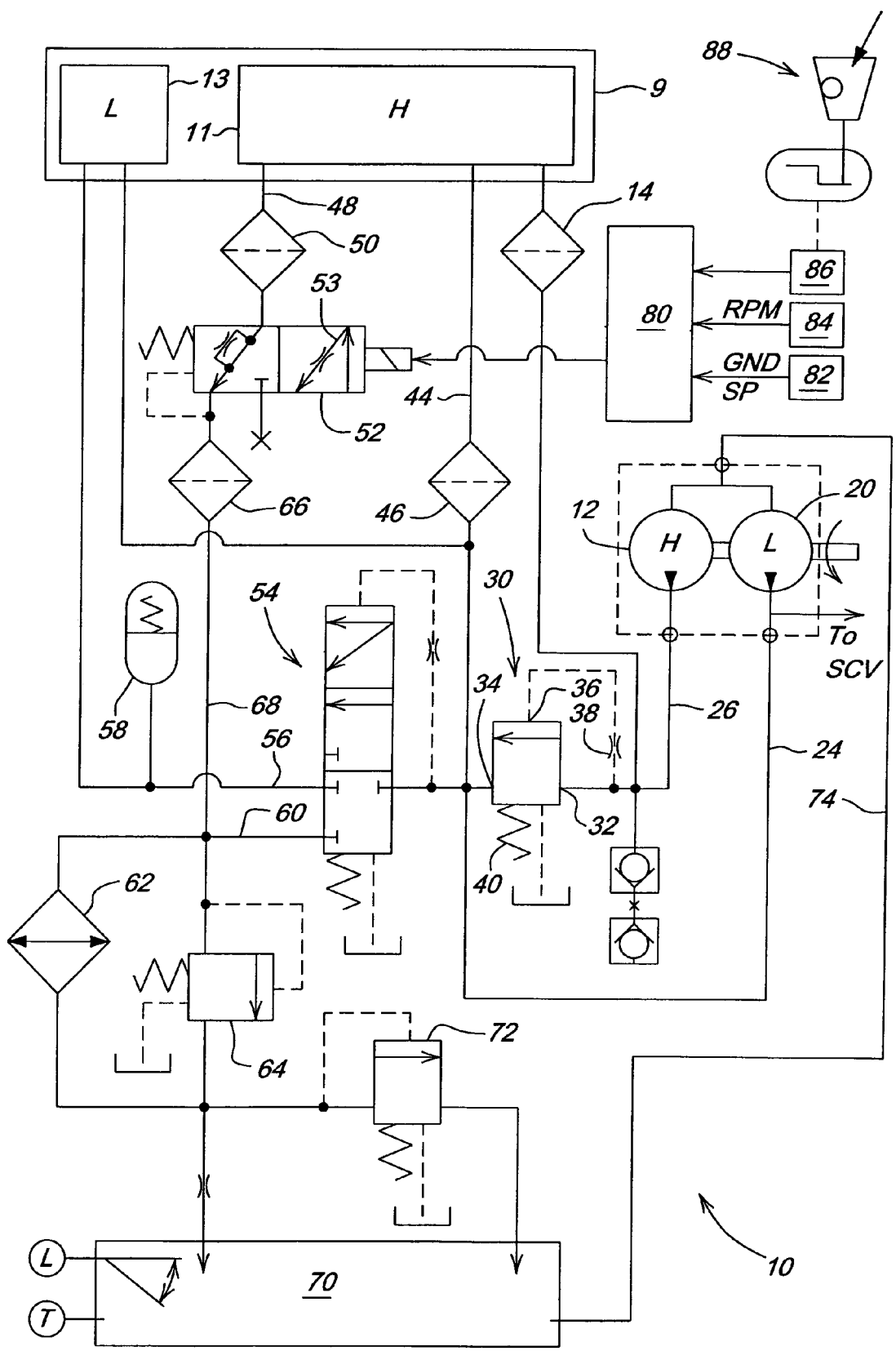

DUAL PUMP DUAL PRESSURE HYDRAULIC CIRCUIT

BACKGROUND

The present invention relates to a hydraulic circuit, such as a hydraulic circuit for a vehicle.

Known vehicle hydraulic systems have both low and high pressure devices or circuits. For example, a known production tractor includes an infinitely variable transmission (IVT) which includes an electro-hydraulic hydrostatic drive unit and a hydro-mechanical transmission. The electro-hydraulic hydrostatic drive unit requires a supply of high pressure hydraulic fluid for operation of a yoke which controls a variable displacement unit, whereas the hydro-mechanical transmission requires only lower supply pressure to operate its transmission control clutches.

In a vehicle hydraulic system, overall system flow requirements are typically dictated by pump sizing at low engine speed, which then results in higher flows and more power loss at higher engine speeds. In this known production system a single high pressure gear pump supplies hydraulic fluid to both these high and low pressure hydraulic components. This single pump must be sized so that it can supply sufficient amounts of hydraulic fluid at low idle engine speeds. However, as a result, at high engine speeds it will supply more hydraulic fluid than is required, producing surplus hydraulic fluid flow and wasting engine power.

Conventional vehicle hydraulic systems have parasitic losses which reduce available hydraulic power. Certain systems use a variable displacement pump to reduce flow as engine speed increases. Other systems use positive displacement gear pumps. But, as engine speed increases, so does hydraulic flow and ultimately, power losses.

SUMMARY

Accordingly, an object of this invention is to provide a vehicle hydraulic system which has reduced or limited power losses.

A further object of the invention is to provide such a vehicle hydraulic system wherein a pump can be minimally sized.

These and other objects are achieved by the present invention, which is a hydraulic system for an engine driven vehicle. The hydraulic system includes a higher pressure engine driven pump for supplying pressurized fluid to a higher pressure circuit via a first supply line. The system also includes a lower pressure engine driven pump for supplying lower pressure fluid to a lower pressure circuit via a second supply line. The system also includes a pressure responsive relief valve. The relief valve has a sensing port connected to the first supply line, an inlet connected to the first supply line, and an outlet connected to the second circuit via the second supply line. The relief valve opens when a demand of the higher pressure circuit is satisfied. A cut-off valve controls communication between the high pressure circuit and a reservoir, and a control unit controls the cut-off valve as a function of operation of the high pressure circuit.

BRIEF DESCRIPTION OF THE DRAWINGS

The sole FIGURE is a simplified schematic diagram of a vehicle hydraulic system according to the present invention.

DETAILED DESCRIPTION

Referring to the sole FIGURE, the hydraulic system 10 controls fluid communication with an infinitely variable transmission (IVT) 9 which includes higher pressure hydrostatic unit controls 11 and lower pressure IVT hydraulic control clutches 13. Such an IVT is known and is described as a four mode hydromechanical transmission in U.S. Pat. No. 6,761,658 issued in July 2004 to Stetler and assigned to the assignee of the present application, which is incorporated by reference herein. Such an IVT is also described by Mistry and Sparks in "Infinitely Variable Transmission (IVT) of John Deere 7000 TEN Series Tractors", ASME IMECE 2002, which is also incorporated by reference herein. This known IVT includes control clutches including a high clutch, a low clutch and a reverse brake clutch. These clutches are operated to cause the IVT to transition between various modes in response to manipulation of the drive lever 88. For example, a mode 2 to mode 3 transition results from disengaging the low clutch and engaging the high clutch, and vise-versa. A mode 1 to mode 5 transition results from disengaging the low clutch and engaging the reverse clutch, and vise-versa.

The hydraulic system 10 includes an engine-driven high pressure positive displacement pump 12 which supplies pressurized fluid at a higher pressure, such as 30 bar, via a first supply line 26 and filter 14 to the hydrostatic unit controls 11 of the IVT 9. The hydraulic system 10 also includes an engine driven low pressure positive displacement pump 20 which supplies lower pressure fluid, such as 20 bar, via a second supply line 24 to lower pressure hydraulic control clutches 13 of the IVT 9.

The hydraulic system 10 also includes a pressure regulating relief valve 30 which has an inlet 32 connected to the first supply line 26, an outlet 34 connected to the second supply line 24, a pressure sensing port 36 communicated with the first supply line 26 via a orifice 38, and a pressure setting spring 40 which is set so that the pressure of fluid communicated to outlet 34 will be limited to a pressure of 30 bar for example.

A make up and cooling flow line 44 communicates fluid from controls 11 via filter 46 to supply line 24. A coolant/lube line 48 communicates fluid from controls 11 via filter 50 to an inlet of a solenoid operated loop flush control valve 52. Valve 52 is spring biased to a first position wherein line 48 is fully opened to line 68. When its solenoid is energized, valve 52 will be in a second or restricted position wherein line 48 is connected to line 68 via an orifice 53.

Supply line 24 is also communicated with an inlet of a pressure relief valve 54. Line 56 communicates an outlet of valve 54 to an accumulator 58 and to a clutch circuit portion of clutch control circuit 13. Line 60 communicates another outlet of valve 54 to a drain via an oil cooler 62 and to an inlet of a cooler relief valve 64. An outlet of valve 52 is communicated to the inlet of valve 64 via filter 66 and line 68. Oil cooler 62 and an outlet of valve 64 are communicated to a reservoir 70 and to an inlet of a lube pressure relief valve 72. Fluid is communicated from reservoir 70 to the inlets of pumps 12 and 20 by line 74.

The solenoid of valve 52 is controlled by a microprocessor-based electronic control unit 80. The control unit 80 receives a ground speed signal from a ground speed or wheel speed sensor 82. The control unit 80 also receives an engine speed signal from an engine throttle position sensor 84 or an engine speed sensor (not shown). The control unit 80 also receives a lever position signal from a lever position sensor 86 coupled to a speed or drive control lever 88 which is used by an operator to control the IVT 9. For example, such a lever is used on production John Deere 7000 TEN series tractors.

The control unit preferably controls the valve 52 as a function of vehicle acceleration derived from the sensed ground speed, engine speed derived from the sensed throttle position and operation of the drive or speed control lever 88. More specifically, the control unit 80 preferably moves valve 52 into its second restricted position during transitions (in either direction) of the IVT between mode 2 and mode 3 and between mode 1 and mode 5. The control unit 80 also preferably moves valve 52 into its second restricted position during steady state operation at engine, speeds less than 1100 rpm. The control unit 80 also preferably moves valve 52 into its second restricted position when engine speed is less than 1500 rpm and vehicle acceleration is greater than 40 meters per hour per 10 milliseconds.

When the demand of the high pressure controls 11 is satisfied, the relief valve 30 opens and supplies fluid from the first high pressure supply line 26 to the second lower pressure supply line 24 at a pressure, such as 20 bar, which is lower than the pressure produced by the high pressure pump 12. As a result, low pressure pump 20 can be minimally sized so as to supply only the normal requirements of clutch unit 13. Minimizing the size of pump 20 will reduce the engine power required to drive pump 20, thus making more engine power available for other functions and tasks.

The relief type pressure control valve 30 maintains control pressure for hydrostatic unit controls 11 and excess flow during steady state operation is allowed to combine with the flow from pump 20 for transmission clutches 13 and other functions such as cooling and lubrication. In addition, the valve 52 controls charge flow takeoff from the hydrostatic unit controls 11 during certain specific engine speed and shift sequences and is controlled by the electronic control unit 80.

Without the controlled cut-off valve 52, the loop flush flow from the hydrostatic unit controls 11 would be determined by pressure drop across a fixed orifice, and would increase flow take off from the control circuit at lower engine speeds, which is not what is desired. The valve 52 reduces this flow during transients of the hydrostatic unit controls 11, shift transients and low engine speeds enables this flow to be utilized for clutch shifting or refilling of the shift accumulator 58. Combining these circuit functions reduces overall system flow and reduces power loss. Each circuit and pump can be sized appropriately for its needs, thus reducing power loss.

While the present invention has been described in conjunction with a specific embodiment, it is understood that many alternatives, modifications and variations will be apparent to those skilled in the art in light of the foregoing description. For example, the hydraulic circuit could control fluid communication with other higher and lower pressure hydraulic functions, including high pressure conventional vehicle hydraulic functions or components such as implements, steering, brakes, the front independent link suspension cylinders and/or active seat components, and lower pressure vehicle hydraulic functions. Accordingly, this invention is intended to embrace all such alternatives, modifications and variations which fall within the spirit and scope of the appended claims.

We claim:

1. A vehicle hydraulic system comprising:
    a higher pressure pump for supplying pressurized fluid to a higher pressure circuit via a first supply line; and
    a lower pressure pump for supplying pressure fluid to a lower pressure circuit via a second supply line;
    a control valve controlling communication between the high pressure circuit and a reservoir;
    a pressure regulating relief valve having an inlet connected to the first supply line, an outlet connected to the second supply line and a pressure sensing port communicated with the first supply line, the relief valve opening when a demand of the higher pressure circuit is satisfied and supplying fluid from the first supply line to the second supply line at a pressure lower than the pressure produced by the higher pressure pump; and
    a control unit for controlling the control valve as a function of operation of the high pressure circuit, the control valve having an inlet communicated with the high pressure circuit, an outlet communicated with a reservoir and a valve member, the valve member having a first position herein the inlet is freely communicated with the outlet, and having a second position wherein the inlet is communicated with the outlet via an orifice.

2. The hydraulic system of claim 1, wherein:
    the higher pressure pump and the lower pressure pump are engine driven.

3. A vehicle hydraulic system for a vehicle having an engine driving a transmission, the transmission having a hydrostatic unit with an actuator controlled by a high pressure circuit and having control clutches controlled by a low pressure circuit, the hydraulic system comprising:
    a high pressure positive displacement pump for supplying pressurized fluid to the high pressure circuit via a first supply line; and
    a low pressure positive displacement pump for supplying low pressure fluid to the low pressure circuit via a second supply line;
    a control valve controlling communication between the high pressure circuit and a reservoir;
    a pressure regulating relief valve having an inlet connected to the first supply line, an outlet connected to the second supply line and a pressure sensing port communicated with the first supply line, the relief valve opening when a demand of the higher pressure circuit is satisfied and supplying fluid from the first supply line to the second supply line at a pressure lower than the pressure produced by the higher pressure-pump; and
    a control unit for controlling the control valve as a function of operation of the high pressure circuit.

4. The hydraulic system of claim 3, wherein:
    the control valve has an inlet communicated with the high pressure circuit, an outlet communicated with a reservoir and a valve member, the valve member having a first position wherein the inlet is freely communicated with the outlet, and having a second position wherein the inlet is communicated with the outlet via an orifice.

5. The hydraulic system of claim 3, wherein: the control unit controls the control valve as a function of operation of the transmission.

6. The hydraulic system of claim 3, wherein:
    the transmission comprises an infinitely variable transmission (IVT); and
    the control unit controls the control valve as a function of operation of the IVT.

7. The hydraulic system of claim 3, wherein:
    the higher pressure pump and the lower pressure pump are driven by the engine.

8. A vehicle hydraulic system comprising:
    a higher pressure pump for supplying pressurized fluid to a higher pressure circuit via a first supply line, the high pressure circuit forming a portion of a transmission; and
    a lower pressure pump for supplying pressure fluid to a lower pressure circuit via a second supply line;

a control valve controlling communication between the high pressure circuit and a reservoir;

a pressure regulating relief valve having an inlet connected to the first supply line, an outlet connected to the second supply line and a pressure sensing port communicated with the first supply line, the relief valve opening when a demand of the higher pressure circuit is satisfied and supplying fluid from the first supply line to the second supply line at a pressure lower than the pressure produced by the higher pressure pump; and a control unit for controlling the control valve as a function of operation of the high pressure circuit, the control unit controlling the control valve as a function of operation of the transmission.

9. A vehicle hydraulic system comprising:

a higher pressure pump for supplying pressurized fluid to a higher pressure circuit via a first supply line, the high pressure circuit forming a portion of an infinitely variable transmission (IVT); and a lower pressure pump for supplying pressure fluid to a lower pressure circuit via a second supply line;

a control valve controlling communication between the high pressure circuit and a reservoir;

a pressure regulating relief valve having an inlet connected to the first supply line, an outlet connected to the second supply line and a pressure sensing port communicated with the first supply line, the relief valve opening when a demand of the higher pressure circuit is satisfied and supplying fluid from the first supply line to the second supply line at a pressure lower than the pressure produced by the higher pressure pump; and a control unit for controlling the control valve as a function of operation of the high pressure circuit, the control unit controlling the control valve as a function of operation of the IVT.

* * * * *